United States Patent
Krishnamoorthy et al.

(10) Patent No.: US 9,477,492 B2
(45) Date of Patent: Oct. 25, 2016

(54) DEPLOYING MULTI-CHANNEL OR DEVICE AGNOSTIC APPLICATIONS

(71) Applicant: Bank of America Corporation, Charlotte, NC (US)

(72) Inventors: Sundar Krishnamoorthy, East Windsor, NJ (US); Devi S. Kumar, West Windsor, NJ (US); Suresh G. Nair, Robbinsville, NJ (US)

(73) Assignee: Bank of America Corporation, Charlotte, NC (US)

( * ) Notice: Subject to any disclaimer, the term of this patent is extended or adjusted under 35 U.S.C. 154(b) by 226 days.

(21) Appl. No.: 14/224,317

(22) Filed: Mar. 25, 2014

(65) Prior Publication Data
US 2015/0227302 A1    Aug. 13, 2015

Related U.S. Application Data

(60) Provisional application No. 61/939,186, filed on Feb. 12, 2014.

(51) Int. Cl.
| | | |
|---|---|---|
| *G06F 13/00* | (2006.01) | |
| *G06F 15/00* | (2006.01) | |
| *G06F 9/44* | (2006.01) | |

(52) U.S. Cl.
CPC .............. *G06F 9/4443* (2013.01); *G06F 8/76* (2013.01)

(58) Field of Classification Search
CPC ..................... G06Q 10/06311; G06Q 17/30
USPC ..................... 715/762–765, 748, 740–743
See application file for complete search history.

(56) References Cited

U.S. PATENT DOCUMENTS

| | | | |
|---|---|---|---|
| 7,315,826 B1 | 1/2008 | Guheen et al. | |
| 8,121,874 B1 | 2/2012 | Guheen et al. | |
| 9,218,344 B2 * | 12/2015 | Al-Kofahi | G06F 17/30 |
| 2003/0023473 A1 * | 1/2003 | Guyan | G06Q 10/06311 |
| | | | 705/4 |

OTHER PUBLICATIONS

AppNotch, "Easiest way to create Apps," Feb. 7, 2014, retrieved from http://web.archive.org/web/20140207151427/http://www.appnotch.com/[Nov. 5, 2014 2:39:19 PM] on Nov. 5, 2014.

(Continued)

*Primary Examiner* — Kevin Nguyen
(74) *Attorney, Agent, or Firm* — Banner & Witcoff, Ltd.; Michael A. Springs (57) ABSTRACT

Various user interface components and features can be tested and simulated with the unified framework module, and the full application user experience can be tested, experienced and evaluated. This can assist the design process of an application in providing the ability to test and explore different user interface components. During this process the user components can be simulated to provide the user experience so it can be determined whether the user components are organized properly and the prototype can be validated before the full blown application is launched. Also user interface features can be further modified or added based on the user feedback. The unified framework module can be configured to package a program in a form that is suitable for any targeted device and/or channel to make deployment across various devices and channels more efficient and cost effective.

20 Claims, 4 Drawing Sheets

(56) References Cited

OTHER PUBLICATIONS

Ranaivo, Yann, "Mobile development firm moves into Innovation Depot," Birmingham Business Journal, dated Jan. 14, 2014, downloaded Mar. 10, 2014 from http://innovationdepot.net/2014/01/mobile-development-firm-moves-into-innovation-depot/, 3 pages.

Jan. 14, 2016—(US) Non Final Office Action—U.S. Appl. No. 14/514,923.

* cited by examiner

DEPLOYING MULTI-CHANNEL OR DEVICE AGNOSTIC APPLICATIONS

CROSS REFERENCE TO RELATED APPLICATION

This application claims benefit to U.S. Provisional Application No. 61/939,186 filed on Feb. 12, 2014.

FIELD

Aspects of the disclosure generally relate to developing multi-channel deployable, device agnostic applications. More specifically, aspects of the disclosure provide example methods and example apparatuses that provide a unified framework for implementing a multi-channel deployable device agnostic application.

BACKGROUND

Developing and coding a user interface, for example, on a mobile application can often times be a very time consuming and difficult process. The process can be more difficult when writing code for multi-platform applications that are configured to run on different devices and channels. Each device or channel can have its very own set of features that may have to be accounted for during the deployment of the application. For example, implementing a user interface for a touchscreen device can be very different from designing a user interface for a non-touch screen device.

One approach may include focusing on the particular device or channel and adapting the application to the particular platform of the device. Although this approach may be useful in certain instances, following this approach may result in the need to design the application multiple times for each device or channel in implementing the application. Another approach may include focusing directly on the application to be deployed and to design the application to have a similar appearance and feel across each device and channel. To implement the application on a particular device, one approach may be to translate the program into the appropriate code for the particular device.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

An example method for developing a device agnostic application may include one or more of: (1) providing an application having one or more user interface components, (2) analyzing the application for the one or more user interface components (3) assembling the user interface components from a repository, or (4) extending the application and the user interface to at least one device or channel.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of examples various examples in which the disclosure may be practiced. It is to be understood that other embodiments may be utilized and structural and functional modifications may be made without departing from the scope of the present disclosure. The disclosure is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. For example, the use of "including" and "comprising" and variations thereof is meant to encompass the items listed thereafter and equivalents thereof as well as additional items and equivalents thereof, and the use of the terms "mounted," "connected," "coupled," "positioned," "engaged" and similar terms, is meant to include both direct and indirect mounting, connecting, coupling, positioning and engaging.

As noted above, various aspects of the disclosure relate to developing multi-channel deployable, device agnostic applications. Before discussing these aspects in greater detail, however, several examples of network architectures and data processing devices that may be used in implementing various aspects of the disclosure will first be discussed.

Figure 1:
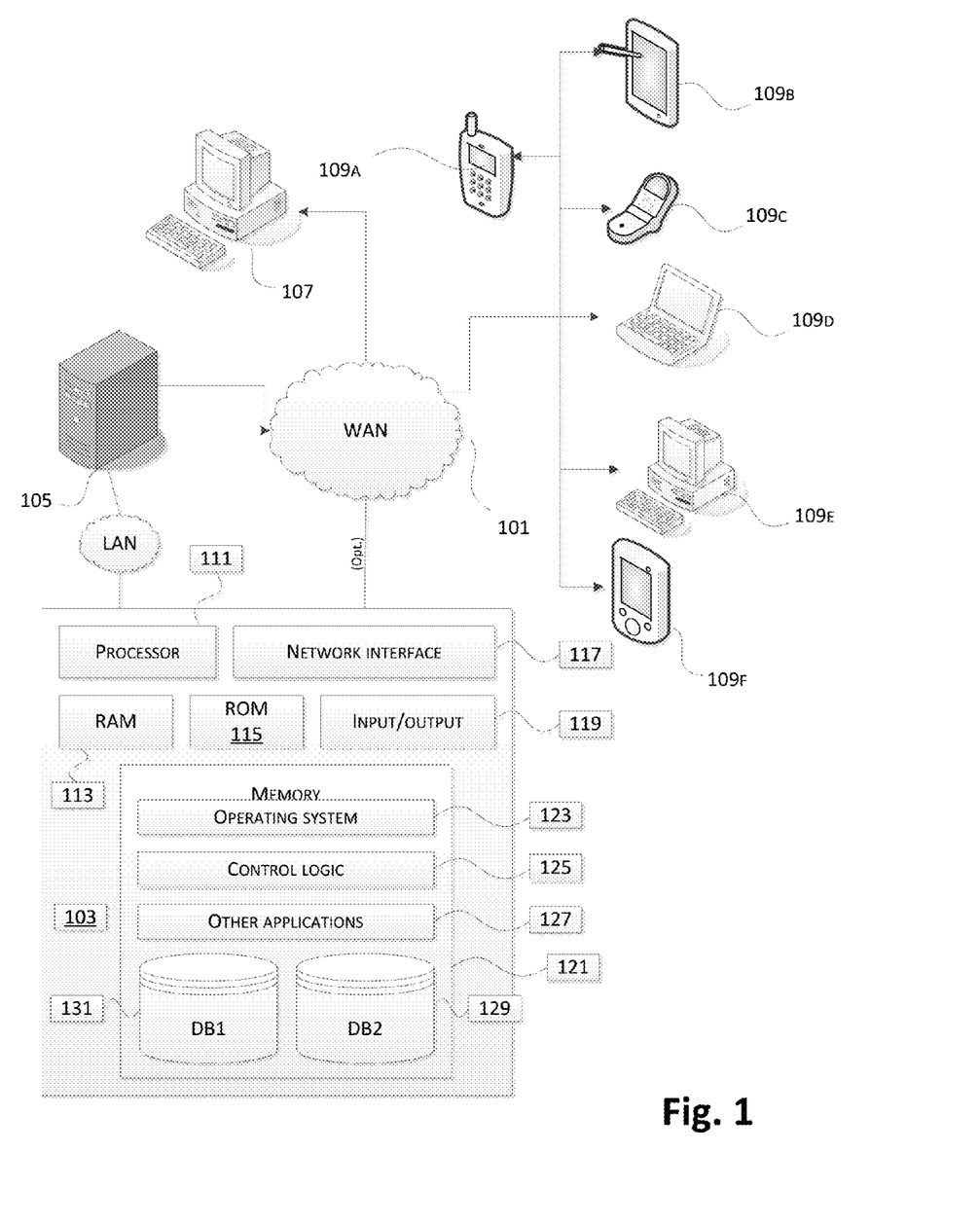
FIG. 1 illustrates one example of a network architecture and data processing device that may be used to implement one or more illustrative aspects discussed herein.

FIG. 1 illustrates one example of a network architecture and data processing device that may be used to implement one or more illustrative aspects. Various network nodes 103, 105, 107, and 109A-F may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109A-F and other devices (not shown) may be connected to one or more of the networks via twisted pair wires, coaxial cable, fiber optics, radio waves or other communication media. For example, the above connections can be made via the internet, blue tooth, WiFi, infrared, or any other known method of wireless transmission.

As shown in FIG. 1, devices 109A-F may include personal computers such as desktops, laptops, notebooks, mobile telephones or smartphones with applications and other functionality, a handheld device with Wi-Fi or other wireless connectivity (e.g., wireless enabled tablets, tablet computers, PDAs, and the like), displays with built-in or external memories and processors, or any other known computer, computing device, or handheld computer can also be connected to one or more of the networks described herein. It is also contemplated that other types of devices such as ATMs, kiosks, and other devices can be connected to one or more of the networks described herein. These devices can be enabled to communicate with wireless access points which in one example can be a series of cellular towers hosted by a service provider. Additionally, the wireless access points may be Wi-Fi (e.g., compatible with IEEE 802.11a/b/g/and the like wireless communication standards) connections and the computing devices may obtain access to the Internet at these connections. Other known techniques may be used to allow devices to connect with a network.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, and devices 109a-f. Data server 103 provides overall access, control and administration of databases and control software for performing one or more illustrative aspects as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, devices 109a-f, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 or devices 109a-f a user may access web server 105 using an Internet browser, as is known in the art, or by executing a software application or app that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device as discussed herein. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, or the like), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects as described herein, and other application software 127 providing secondary, support, and/ or other functionality which may or may not be used in conjunction with one or more aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, or the like).

Memory 121 may also store data used in performance of one or more aspects, including a first database 129 and a second database 131. In some embodiments, the first database may include the second database (e.g., as a separate table, report, or the like). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109a-f) as described herein may be spread across multiple data processing devices, for example, to distribute processing load across multiple computers, to segregate transactions based on geographic location, user access level, quality of service (QoS), or the like.

One or more aspects may be embodied in computer-usable or readable data and/or computer-executable instructions, such as in one or more program modules, executed by one or more computers or other devices as described herein. Generally, program modules include routines, programs, objects, components, data structures, or the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, or the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

Figure 2:
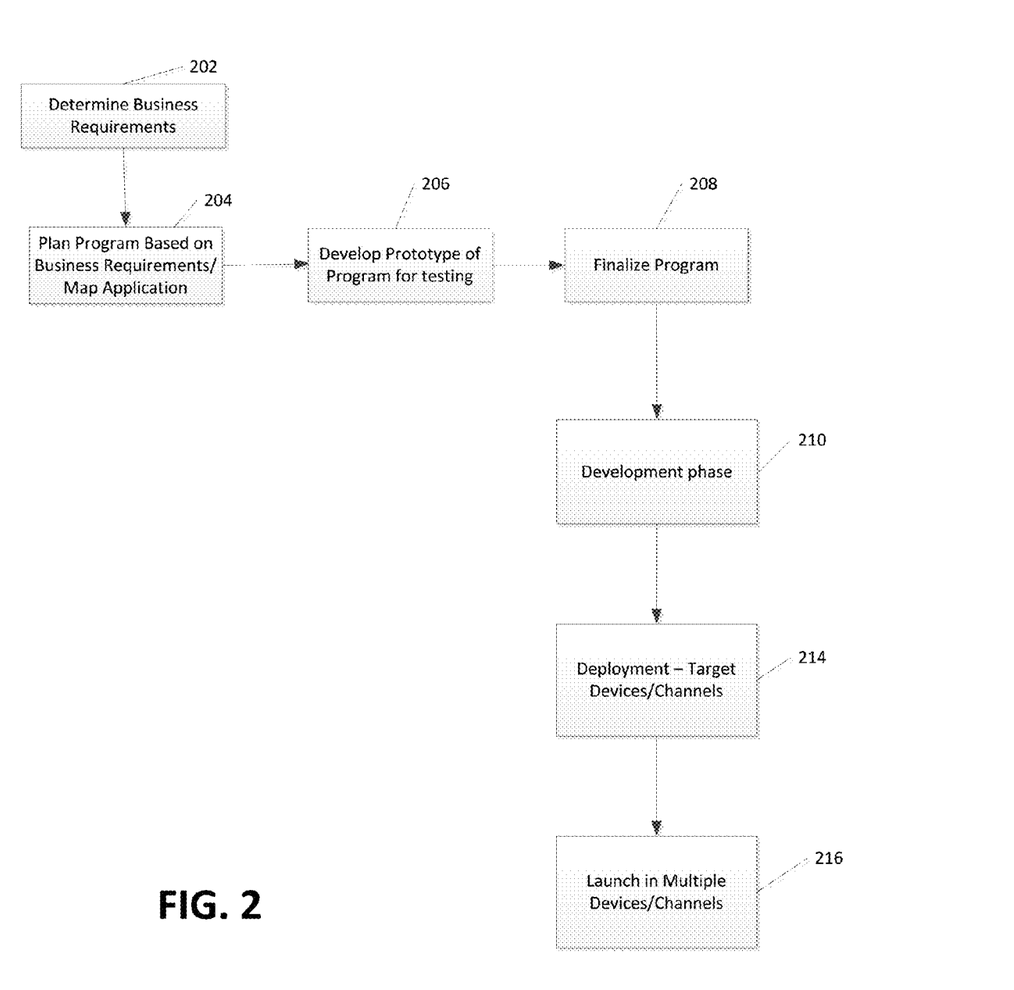
FIG. 2 illustrates a schematic of an exemplary process disclosed herein.

Aspects of an application building process, where an end-to-end user interface can be developed to launch in multiple channels or devices, will now be described in relation to FIGS. 2-4. In step 202, the application requirements can be received, which is also represented in FIG. 4 at step 404. The application requirements can come in many different forms and may identify certain goals that are to be included in the application and the user interface of the application. During this process, the program can be developed based on the desired requirements, and the application can also be mapped out in terms of what needs to be developed as a reusable widget in step 204. For example, the look and feel of the program, certain menu items, display features, tools, and the like can be determined and stored for future access in a repository 316 as part of a unified framework module 304, which will be described in further detail below.

In step 206, also shown in FIG. 4 as step 406, a prototype of the program can be developed for testing in the unified framework module 304. In this way, various user interface components and features can be tested and simulated, and the full application user experience can be tested, experienced and evaluated. This can assist the design process in providing the ability to test and explore different user interface components. During this process the user components can be simulated to provide the user experience so it can be determined whether the user components are organized properly, and the prototype can be validated before the full blown application is launched. Also user interface features can be further modified or added based on the user feedback. This process can undergo various iterations until the prototype and the user experience is perfected, and the concept is otherwise validated.

The program can then be finalized and can go through an appropriate approval process in step 208. The approval process can include approval by individuals or the program can undergo various automated code checks in the unified framework module 304. Once the product is finalized, the program can be passed off to the development phase and to various developers in step 210 in FIG. 2, which is also illustrated in step 410 in FIG. 4. Next or in conjunction with the development phase, a unified framework module 304 can be applied to the program where developers can build and publish the program to an entire community of developers. Once the developers determine the user interface components of the program, the application may then be built by the unified framework module 304. In particular, pieces of the application can be obtained from the unified framework components repository as represented by step 411. The program can then enter the deployment phase 214, 414 where the product is targeted at particular devices and channels through the unified framework module 304. For example, the product could be targeted for an application configured for a desktop computer at a call center, a mobile or tablet application, or other online or web-based application that the user can access by logging into the system. This can occur in a visual studio 318 in the unified framework module 304 where the program is built for evaluating/testing, and/or perfecting the prototype or application and eventually released to the end users at step 420.

In this process, which may occur in the unified framework module 304, the program is packaged and the necessary components are pulled together and bundled for the specific device or channel. In this way, the user interface is built for multiple devices and channels and can be customized and reused in each device or channel. The user interface is, thus, reusable and customized, and various variables, such as the screen size, environment, capabilities of the device or channel, inputs (e.g. keyboard, mouse, touch screen), and the like, are taken into account. The unified framework module 304 can, thus, reflect or adapt to the different environments created by the devices or channels. In this process, no code conversion needs to occur, since the framework of the user interface is pre-packaged. The program can be subsequently launched across various devices and channels at step 216 by reusing the user interface components across all channels and devices.

The unified framework module 304 helps to provide an end-to-end process where the requirements of the application are mapped out into reusable user interface components, and to provide a centralized repository. The centralized repository provides a robust inventory that can be reused and allows the ability to discover, collect feedback, and assemble programs. This can make the application design journey more efficient and more consistent.

Figure 3:
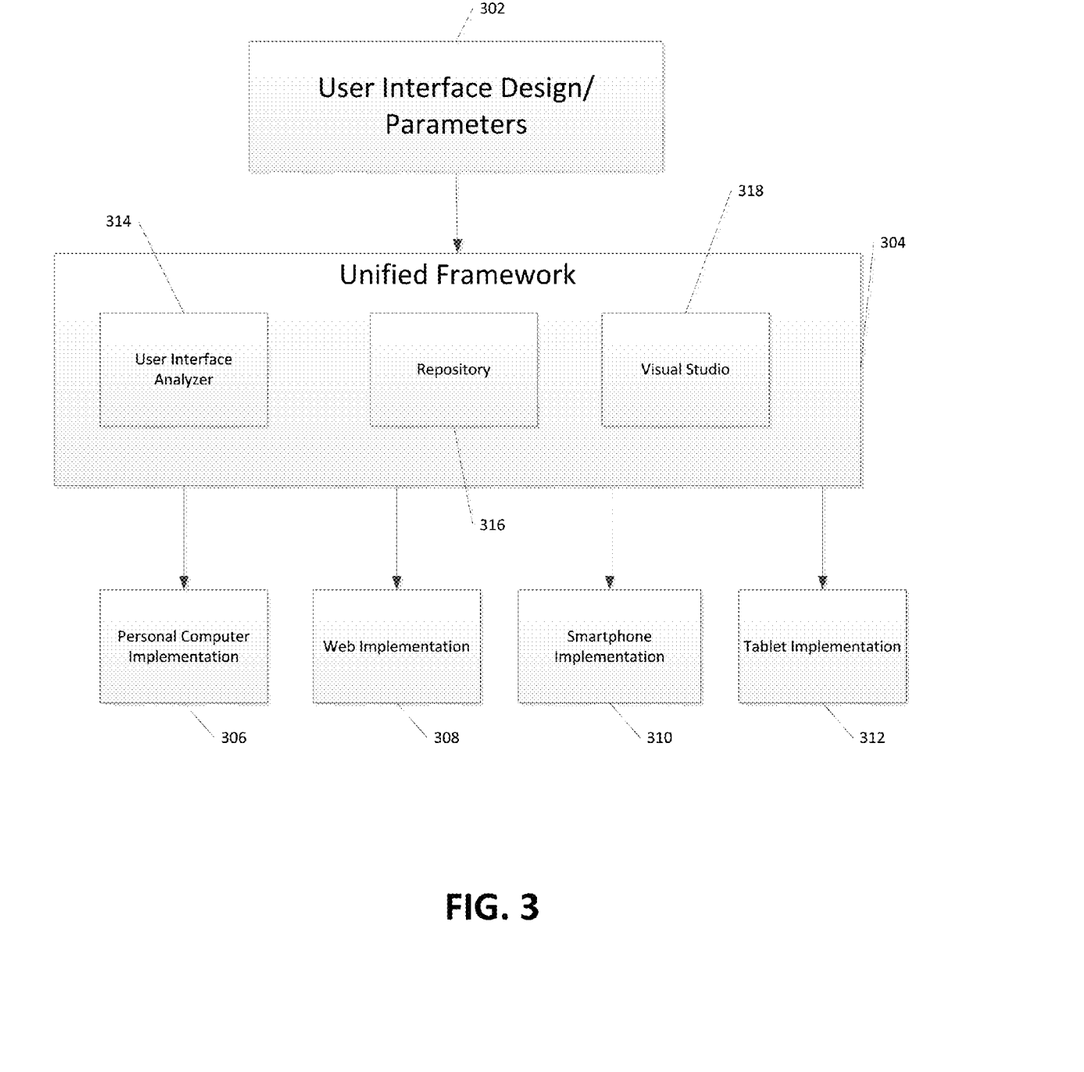
FIG. 3 illustrates a schematic of an exemplary system disclosed herein.
Figure 4:
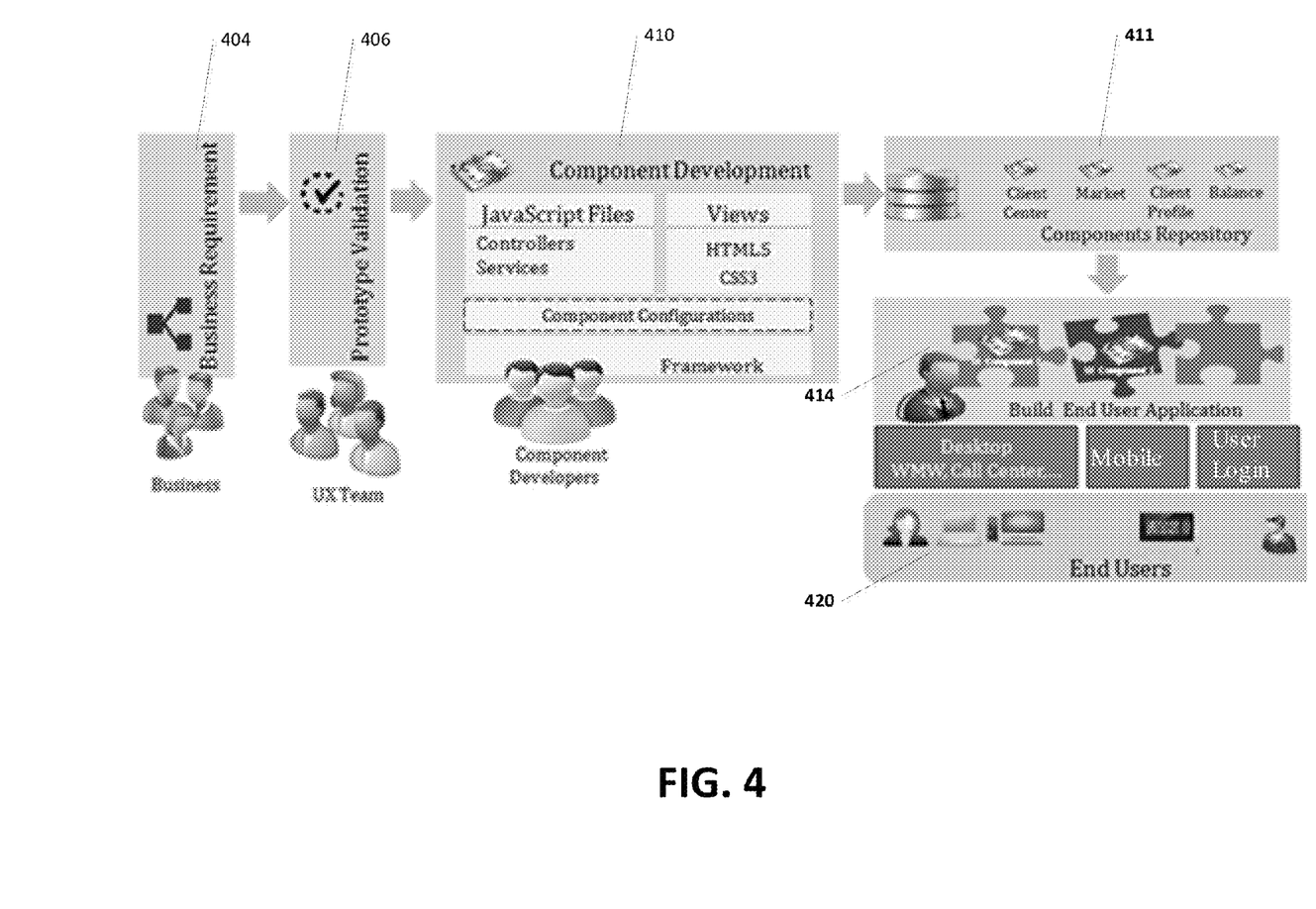
FIG. 4 illustrates a schematic of an example process flow disclosed herein.

As depicted schematically in FIG. 3, the unified framework module 304 can detect and simulate the user interface in each device (e.g. personal computer, web, smartphone, tablet, and the like) such that the program can be built in each device. The unified framework module 304 can also package the program in a form that is suitable for each device and/or channel. The unified framework module 304 can also act as a testing module where the program can be tested in various devices, such as a personal computer 306, web-based environment 308, smart phone 310, or tablet 312, and other operating systems depending on the devices and channels that are targeted. The unified framework module 304 can pull up each operating system and or device parameters to implement the program on each device or channel, and the unified framework module 304 can be configured to support each of the desired devices or channels.

The unified framework module 304 can also be configured to be backwards compatible to accommodate older devices and channels. The unified framework module 304 can be configured to evaluate legacy programs or programs that have been previously launched during the development lifecycle for updating purposes or to adapt legacy programs or previously launched programs to different devices or channels. The unified framework module 304 can package the program into the appropriate framework that is suitable for each device by building and deploying the program for the targeted devices and channels and deploy the end product.

The unified framework module 304 may also provide an ecosystem where the user can build individual user interface components or access templates. The access templates can include one or more of the desired user interface components that can be used to build the application. As shown in FIG. 4, the unified framework module can include JavaScript Files that may include controllers and services, Views containing such files as HTML5 and CSS3 files, and various other component configurations for assembling an application. The unified framework module 304 may also provide a centralized build feature that allows the program to be published in the repository 316. In publishing the program, the various features can be evaluated and validated to perfect the program. This can occur in a visual studio module 318 at the unified framework module 304 where the program is built for testing and viewing. The unified framework module 304 ecosystem can also provide a centralized way to attach each user interface component from the repository during the build process. This can also create a high level of reusability, which aids in quickly assembling the program and cutting down on development and implementation time. This assists in prototype validation where the various user interface components can be built and added to the repository for future prototype validation. The unified framework module and repository 316 provides everything in one place such that everything can be accessed in a centralized location, where the user can access the unified framework module 304 and repository 316 and quickly locate and assemble the user interface components.

The user interface analyzer 314 can be a module configured to analyze the program for user interface components. For example, the user interface analyzer 314 can review programs to extract and break down the programs into their various user interface components and capture the unique experience delivered by the program. The user interface analyzer 314 can review a webpage, for example, and can visually break down the webpage into its various user interface components (e.g. marketing material, text tabs, menu structures, touch items, information displays, scroll bars, and the like). Each of these features or visual user interface components can be parsed out of the program. Each of these components can then be extracted from the repository 316, and the unified framework can builds a prototype of the program from the user interface components extracted by the user interface analyzer. Each of the user interface features can be implemented across the targeted devices and channels to provide a consistent look and feel of the user interface components across all devices and channels.

The unified framework module 304 can also provide standards and guidelines that can be used to assemble and build applications. This can also assist in maximizing reusability since the program is developed within predetermined boundaries or rules. When guidelines are implemented, reusability is promoted because the development is bound by the rules defined by the unified framework module 304 build capabilities, user interface analyzer 314, repository 316, and visual studio 318. Also the unified framework module 304 can be configured to check the underlying code on each device for errors to facilitate the launch process.

In one example, after program features are extracted from the developers, the unified framework module 304 can provide support to multiple devices or channels by identifying and launching various APIs across each device or channel instead of developing new code for each device or channel. In this way, when the unified framework module 304 is called upon, no translation or conversion is conducted, rather the unified framework module 304 can find the common feature and determine the code or API appropriate for the device or channel and call the desired code or API from the repository 316 and build the features according to the way that it is called in the device.

For example, the unified framework module 304 can identify an image capturing feature and make use of a common API across each targeted device for the program. In this way, the program can be abstracted and may not need any translation to launch the program in the various targeted devices or channel.

In a working example, the program to be implemented could be written in java. The unified framework algorithm will execute the program in the desired environment. In particular, the program can take the java program and access the framework container to extract the functionality and user interface from the framework to get whatever items needed for the targeted devices to launch to each of the targeted devices. In this way, the usability is promoted without compromising the native user experience through the use of the unified framework module 304. The unified framework module 304 can provide the appropriate support for launching the program in the targeted devices and channels.

The features of the application, such as the user interface features and feature sets designed and developed to the unified framework module 304, can be stored into a system repository 316, which can be a centralized repository for easy access during the development and lifecycle of the program. The repository can be accessed during the development of the application such that the various user interface features can be easily accessed during the design and build and deployment processes. The repository can also act as an inventory of the user interface features that can be used in the development of the user interface. For example, the repository provides a centralized location to store, discover, browse, modify and retrieve the user interface features and components and build additional user interface components by composing them together or creating end-to-end applications consisting of multiple user interface components. This also facilitates a conduit to develop rapid prototypes of new user experiences, with sharable user interface components across the enterprise that are easily created, and deployed at a rapid pace. The prototypes may also be published in the repository for accessing during the validation process.

Additionally, the repository can be used to collect feedback. The feedback can also be stored into the repository such that the feedback can be reviewed during the development of the product. For example, the feedback can be organized so as to be attributed to a particular screen or particular feature. In another example, the screens can be labeled by a reference number(s) or letter(s) and the feedback can be stored to each reference number(s)/letter(s). This feature can make the whole design process more powerful and cost effective during the design and build process.

In one exemplary aspect, the unified framework module 304 can provide a transformational experience of the application where during the development of the application, the unified framework module 304 can provide a useful tool in perfecting the application before delivering the application to the targeted devices or channels. It can also assist in tying together designers, developers, and the business in the development of the application, in that everyone that is involved with the process can test the prototypes and provide feedback during the development process across all devices and channels.

In another exemplary aspect, the system described herein may help provide a richer user experience across all platforms, channels and devices by maintaining a highly interactive user interface across any device, platform or channel that supports highly interactive user interfaces. For example, rather than designing the application to the lowest common denominator user interface, the application of the unified framework can carry over touch friendly features (e.g., touch enabled gestures, swipe features), pop-up bars, and various menu items into the devices that support it. The system helps the application adapt to the channel or device and helps avoid cutting back on highly interactive features on devices and channels that support them. The system can also help cut down on writing native code for each device or channel because the unified framework is able to bring the desired functionality into each device or channel automatically.

An example method for developing a device agnostic application may include one or more of (1) providing an application having one or more user interface components, (2) analyzing the application for the one or more user interface components (3) assembling the user interface components from the repository (4) extending the application and the user interface to at least one device or channel. A unified framework module may extend the application and the user interface to at least one device or channel. The method may also optionally include storing the user interface components in a repository, which provides a centralized location to store, discover, browse, modify, and retrieve the user interface components.

The user interface intentions and behaviors can be preserved end to end and during the deployment of the application. The method may also optionally include providing a visual studio for building a prototype of the application in the at least one device or channel and evaluating and testing the application. The user interface components of the repository can be reusable. The unified framework module can be used to simulate the user interface in the at least one targeted device or channel. The method may also optionally include extending the application and the user interface to a second device or channel through the unified framework module. The method may also optionally include providing access templates having the one or more user interface components for building the application. The method may also optionally include collecting feedback and storing the feedback into the repository for later viewing and perfecting the application.

In another example a unified framework module can include a user interface analyzer configured to analyze a program for user interface components, a repository configured to store the user interface components, and a visual studio configured to build a prototype of the program. The user interface analyzer can extract the user interface components of the program from the repository. The visual studio or the unified framework module can build the prototype of the program from the user interface components extracted by the user interface analyzer. The visual studio can simulate the program for testing and viewing. The unified framework module can be configured to package the program in a form that is suitable for a plurality of devices or channels. The visual studio can be configured to collect feedback on the prototype, and the repository can be configured to store the feedback.

An example method may include analyzing an application having one or more user interface components, extracting the user interface components from the application, building the user interface with the user interface components from a centralized repository, and extending the application having the one or more the user interface components to a plurality of channels or devices. The method can further include storing the user interface components in the centralized repository, and the centralized repository can provide a centralized location to store, discover, browse, modify, and retrieve the user interface components. The method may further include providing a visual studio for building a prototype of the application in the at least one device or channel and evaluating and testing the application. The user interface components of the repository can be reusable. The method may also include simulating the user interface in the at least one targeted device or channel, providing access templates having the one or more user interface components for building the application, and collecting feedback and storing the feedback into the repository for later viewing and perfecting the application.

An example method can include creating an application having one or more user interface components by extracting the user interface components from a centralized repository, simulating the application in a visual studio, and extending the application and the user interface to a plurality of channels or devices. The method can further include storing the user interface components in the repository, which provides a centralized location to store, discover, browse, modify, and retrieve the user interface components, analyzing the application for the one or more user interface components and assembling the user interface components from the repository.

The visual studio can be configured to build a prototype of the application in the at least one device or channel for evaluating and testing of the application. The user interface components of the repository can be reusable. The method may further include providing access templates having the one or more user interface components for building the application, and collecting feedback and storing the feedback into the repository for later viewing and perfecting the application.

In another example, an apparatus comprising: a processor; and a memory for storing computer readable instructions that, when executed by the processor, can cause the apparatus to perform the methods discussed herein. In another example, one or more non-transitory computer-readable media may have instructions stored thereon that, when executed, cause at least one computing device to perform one or more aspects of the methods discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method for developing a device agnostic application comprising:
   extracting one or more user interface input components from a user interface of an application;
   building a corresponding user interface with user interface input components from a centralized repository; and
   extending the application to a plurality of channels or devices by adapting the corresponding user interface for use on each channel or device such that each input component of the corresponding user interface is included only if the channel or device supports the input component.

2. The method of claim 1 further comprising storing the extracted user interface input components in the centralized repository and wherein the centralized repository provides a centralized location to store, discover, browse, modify, and retrieve the user interface input components.

3. The method of claim 1 further comprising providing a visual studio for building a prototype of the application and evaluating and testing the application.

4. The method of claim 1 further comprising simulating the corresponding user interface in the at least one of the plurality of devices or channels.

5. The method of claim 1 further comprising providing access templates having the one or more user interface input components for building the application.

6. The method of claim 1 further comprising collecting user-generated feedback and storing the user-generated feedback into the repository for later viewing.

7. The method of claim 1, wherein one or more of the user interface input components extracted from the user interface are controlled by a touch gesture, and wherein the touch gesture is preserved in the extended application.

8. The method of claim 1, further comprising receiving a plurality of business requirements to which the extended application must conform.

9. The method of claim 1, wherein one of the user interface input components extracted from the user interface triggers the capture of an image, and wherein the image capturing function is preserved in the extended application.

10. An apparatus comprising:
    a processor; and
    memory storing computer readable instructions that, when executed by the processor, cause the apparatus to:
       create an application having a user interface comprising one or more user interface input components from a centralized repository;
       simulate the application in a visual studio; and
       extend the application and the user interface to a plurality of devices or channels, adapting the user interface for use on each channel or device such that each input component of the user interface is included only if the channel or device supports the input component.

11. The apparatus of claim 10 wherein the centralized repository provides a centralized location to store, discover, browse, modify, and retrieve user interface input components.

12. The apparatus of claim 11 further comprising collecting user-generated feedback and storing the user-generated feedback into the repository for later viewing.

13. The apparatus of claim 10 further comprising analyzing the application for the one or more user interface input components and assembling the user interface input components from the repository.

14. The apparatus of claim 10 wherein the visual studio is configured to build a prototype of the application in at least one of the plurality of devices or channels for evaluating and testing of the application.

15. The apparatus of claim 10 further comprising providing access templates having the one or more user interface input components for building the application.

16. One or more non-transitory computer-readable media having instructions stored thereon that, when executed, cause at least one computing device to:
provide a unified framework module the unified framework module comprising:
a repository configured to store user interface input components,
a user interface analyzer configured to analyze a program for user interface input components and extract user interface input components corresponding to input components from the repository, and
a visual studio configured to test a prototype of the program;
wherein the unified framework builds the prototype of the program from the input components from the repository corresponding to the user interface input components extracted by the user interface analyzer.

17. The one or more non-transitory computer-readable media of claim 16 wherein the visual studio simulates the program for testing and viewing.

18. The one or more non-transitory computer-readable media of claim 16 wherein the unified framework module is configured to package the program in a form that is suitable for a plurality of devices or channels.

19. The one or more non-transitory computer-readable media of claim 16 wherein the visual studio is configured to collect user-generated feedback on the prototype and the repository is configured to store the user-generated feedback.

20. The one or more non-transitory computer-readable media of claim 15 further comprising providing access templates having the user interface input components for building the application.

* * * * *